United States Patent [19]
Le Goff

[11] Patent Number: 5,271,700
[45] Date of Patent: Dec. 21, 1993

[54] FIXING MEMBER

[75] Inventor: Henri Le Goff, Sainte Luce sur Loire, France

[73] Assignee: ACB, Paris, France

[21] Appl. No.: 890,601

[22] PCT Filed: Nov. 15, 1990

[86] PCT No.: PCT/FR90/00819
§ 371 Date: Jul. 13, 1992
§ 102(e) Date: Jul. 13, 1992

[87] PCT Pub. No.: WO92/08900
PCT Pub. Date: May 29, 1992

[51] Int. Cl.$^5$ .............................................. F16B 13/04
[52] U.S. Cl. .......................................... 411/34; 411/55; 403/277; 403/282
[58] Field of Search ................ 411/34, 55, 24, 26, 411/27, 28, 37, 49, 52, 60; 403/282, 277, 370

[56] References Cited

U.S. PATENT DOCUMENTS

| | | | |
|---|---|---|---|
| 3,053,046 | 9/1962 | Fleming, Jr. | 411/60 X |
| 3,093,026 | 6/1963 | Mills et al. | 411/34 |
| 3,889,820 | 6/1975 | Ranger. | |
| 4,020,735 | 5/1977 | Herback | 411/26 |
| 4,108,043 | 8/1978 | Varga | 411/34 |
| 4,797,044 | 1/1989 | Velasco | 411/55 X |

FOREIGN PATENT DOCUMENTS

| | | |
|---|---|---|
| 0226524 | 6/1987 | European Pat. Off. . |
| 2256822 | 6/1974 | Fed. Rep. of Germany . |
| 1056501 | 10/1953 | France . |
| 2647163 | 11/1990 | France . |
| 519214 | 3/1940 | United Kingdom . |

Primary Examiner—Rodney M. Lindsey
Attorney, Agent, or Firm—Sughrue, Mion, Zinn, Macpeak & Seas

[57] ABSTRACT

A fixing member comprising a tie bar (4) having an expandable buffer (5) mounted thereon, the buffer being surrounded by a split ring (14) which is shorter than the length of said buffer (5), said expandable buffer bearing against an endpiece (6) linked to one end of the tie bar, and a nut (11) being screwed onto the opposite end of the tie bar to compress the expandable buffer (5) axially, thereby causing both the buffer and the split ring (14) to expand radially, the fixing member being characterized in that the inside surface of the split ring (14) has a helical groove (17).

7 Claims, 1 Drawing Sheet

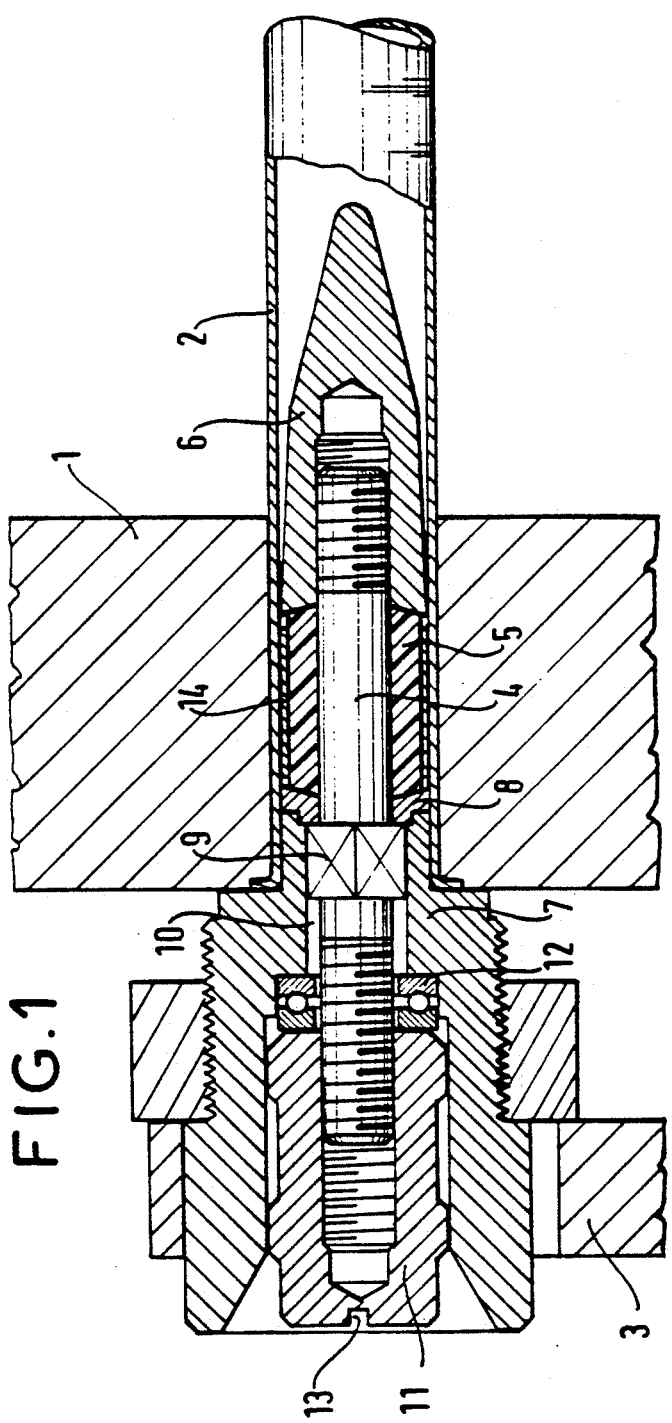
FIG. 1
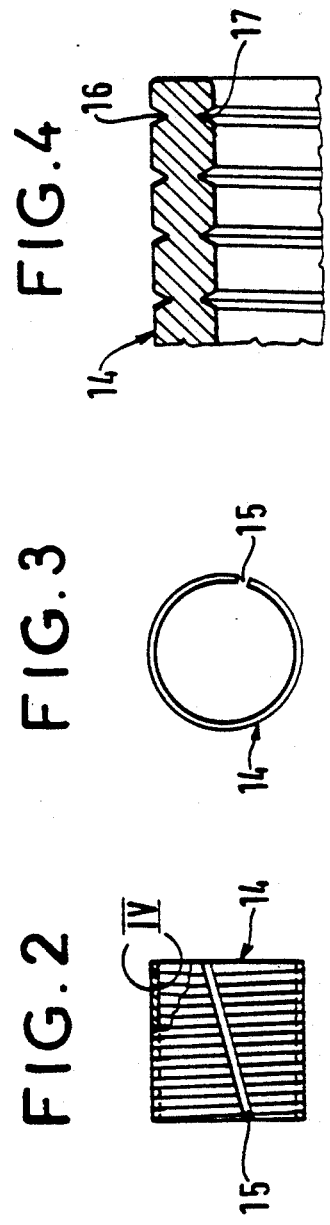
FIG. 2
FIG. 3
FIG. 4

FIXING MEMBER

BACKGROUND OF THE INVENTION

The present invention relates to a fixing member for being received in and fixed securely to a cylindrical hole in a wall of any kind, the member serving to fix, suspend, fasten, etc. an object of some kind.

More particularly, the invention relates to a fixing member comprising a tie bar having an expandable buffer mounted thereon, the buffer being surrounded by a split ring which is shorter than the length of said buffer, said expandable buffer bearing against an endpiece linked to one end of the tie bar, and a nut being screwed onto the opposite end of the tie bar to compress the expandable buffer axially, thereby causing both the buffer and the split ring to expand radially.

FIG. 5 of French patent No. 1 056 501 shows an anchor device of this type in which the tie bar is constituted by a bolt 19 whose head 20 serves as an abutment for the buffer 4. The buffer is surrounded by a split sleeve 5 having a plurality of slots, which slots naturally do not extend over the full length of the sleeve. The assembly is inserted into the cavity and the buffer 4 is compressed by a tapped rod 16 which serves as a nut and which is screwed onto the end of the shank of the bolt. The outside of the sleeve 5 is rough.

SUMMARY OF THE INVENTION

The present invention seeks to improve that type of fixing member so as to enable it to provide fixing which withstands a much higher extraction force.

Thus, the present invention provides a fixing member as defined above, and characterized by the fact that the inside surface of the split ring has a helical groove.

In has been observed that this technique is very important in obtaining an extraction force which is very high, and is much more important than having roughness on the outside surface of the ring.

According to another characteristic, the ring has a single slot extending over its entire length, thereby enabling the ring to expand uniformly over its entire length.

This slot is preferably made obliquely so that the absence of force is not localized on a generator line.

BRIEF DESCRIPTION OF THE DRAWING

Other characteristics of the invention appear from the following description of an embodiment of the invention made with reference to the accompanying drawing, in which:

FIG. 1 is a section through a fixing member of the invention;

FIG. 2 shows a part of the fixing member shown in FIG. 1;

FIG. 3 is an end view of the part shown in FIG. 2; and

FIG. 4 is a view on a larger scale showing a detail IV of FIG. 2.

DESCRIPTION OF THE PREFERRED EMBODIMENTS

In the example described, the fixing member is used to enable a load 3 which may be a maintenance machine, for example, to be suspended from a tube plate 1 fitted with tubes 2 in a water box of an apparatus such as a condenser, a reheater, a steam generator, etc.

The fixing member is thus intended to be fixed inside a tube 2. It comprises a tie bar 4 having an expandable buffer 5 fitted thereover. The buffer 5 is sandwiched between an endpiece 6 which is screwed onto the end of the tie bar and a sleeve 7 which is threaded over the other end of the tie bar. A thrust piece 8 is interposed between the sleeve 7 and the expandable buffer 5. In addition, in order to prevent the tie bar 4 from rotating, it includes a square 9 over which a square section bore 10 of the sleeve 7 is fitted.

A nut 11 is screwed onto the end of the tie bar over which the sleeve is disposed and it bears against the sleeve via a ball bearing abutment 12. The nut 11 is provided with a slot 13 to enable it to be screwed onto the tie bar 4 by means of a calibrated torque screwdriver.

Tightening the nut 11 thus moves the endpiece 6 and the sleeve 7 towards each other, thereby compressing the expandable buffer 5 axially and thus causing it to expand radially.

A split ring 14 is disposed around the expandable buffer 5. The length of the ring 14 is naturally shorter than the length of the expandable buffer 5 so as to allow the buffer to be compressed axially. The inside surface of the ring has a helical groove 17. As a result, while the buffer 5 is being compressed, its outside surface penetrates into said groove and ensures perfect adhesion between the buffer and the ring.

FIGS. 2, 3, and 4 show the ring 14 in detail. It can be seen that the slot 15 in the ring is oblique and does not run along a generator line. In addition, it can be seen that the outside surface of the ring also has a helical groove 16 whose pitch is 1 mm, for example. During regular expansion of the expandable buffer 5, and in like manner to the groove 17 relative to the buffer 5, the groove 16 serves to obtain good adhesion between the ring 14 and the tube 2.

By virtue of this ring 14 which is specially provided with the outside groove 16, the radial force exerted on the tube 2, or more generally on a cylindrical hole in a wall of any kind, is well distributed in uniform manner making it possible to obtain fastening that withstands a very high extraction force.

The slope of the slot 15 prevents absence of force from concentrating along a generator line.

By way of example, tests have shown that in an application where the fixing member is inserted in a tube of a tube plate, a force of about 400 kg is required to extract the fixing member. This result is obtained with a low pressure on the inside wall of the tube and with low tightening torque (of the order of 400 gram-meters) on the nut 11.

When the member is to be installed and fixed remotely, e.g. under remote manipulation or by a robot, the traction force on the tie bar 4 may be obtained by fitting all kinds of positive actuators thereto, e.g. under electrical, pneumatic, hydraulic, electromagnetic, ..., control, instead of using the nut 11.

I claim:

1. A fixing member comprising a tie bar (4) having an expandable buffer (5) mounted thereon, the buffer being surrounded by a split ring (14) which is shorter than the length of said buffer (5), said expandable buffer bearing against an endpiece (6) linked to one end of the tie bar, and a nut (11) being screwed onto the opposite end of the tie bar to compress the expandable buffer (5) axially, thereby causing both the buffer and the split ring (14) to expand radially, the fixing member being characterized in that the inside surface of the split ring (14) has a helical groove (17).

2. A fixing member according to claim 1, characterized in that the split ring (14) has a single slot (15) extending over its entire length.

3. A fixing member according to claim 1, characterized in that the slot (15) extends obliquely.

4. A fixing member according to claim 1, characterized in that a sleeve (7) is threaded over the tie bar (4) between said expandable buffer (5) and said nut (11).

5. A fixing member according to claim 4, characterized in that the tie bar (4) includes a square (4) engaged in a square section bore (10) of said sleeve (7).

6. A fixing member according to claim 4, characterized in that a ball bearing abutment (12) is interposed between said nut (11) and said sleeve (7).

7. A fixing member according to claim 4, characterized in that a thrust piece (8) is interposed between said sleeve (7) and said expandable buffer (5).

* * * * *